United States Patent
Basore et al.

(10) Patent No.: US 6,544,865 B1
(45) Date of Patent: Apr. 8, 2003

(54) METAL FILM INTERRUPTING PROCESS

(75) Inventors: Paul Alan Basore, Caringbah (AU); Neil Barrett, Castle Hill (AU); Trevor Young, Canley Vale (AU)

(73) Assignee: Pacific Solar Pty. Limited, NSW (AU)

( * ) Notice: Subject to any disclaimer, the term of this patent is extended or adjusted under 35 U.S.C. 154(b) by 0 days.

(21) Appl. No.: 09/673,053

(22) PCT Filed: Apr. 9, 1999

(86) PCT No.: PCT/US99/00268

§ 371 (c)(1),
(2), (4) Date: Nov. 7, 2000

(87) PCT Pub. No.: WO99/53554

PCT Pub. Date: Oct. 21, 1999

(30) Foreign Application Priority Data

Apr. 9, 1998 (AU) ................................. PP2903

(51) Int. Cl.⁷ ........................ H01L 21/301; H01L 21/46
(52) U.S. Cl. ........................................ 438/460; 436/463
(58) Field of Search ................... 438/74, 98, 460, 438/463; 257/53, 59; 136/243, 244; 219/121.6, 121.67, 121.68

(56) References Cited

U.S. PATENT DOCUMENTS

| | | | |
|---|---|---|---|
| 4,670,639 A | * | 6/1987 | Behn ................. 219/121.69 |
| 4,783,421 A | * | 11/1988 | Carlson et al. ................. 438/80 |
| 5,208,437 A | | 5/1993 | Miyauchi et al. ...... 219/121.67 |
| 5,899,729 A | * | 5/1999 | Lee ........................ 438/460 |

FOREIGN PATENT DOCUMENTS

| | | | |
|---|---|---|---|
| AU | WO 97/24768 | * | 7/1997 |
| DE | 3705500 | | 9/1988 |
| WO | WO89/12525 | | 12/1989 |
| WO | WO97/24768 | | 7/1997 |

* cited by examiner

Primary Examiner—George Fourson
Assistant Examiner—Hsien-Ming Lee
(74) Attorney, Agent, or Firm—Jordan and Hamburg LLP

(57) ABSTRACT

A simple thin film structure is illustrated in which a substrate (11), which may be glass or any other suitable substrate material, supports a device structure (12), over which is formed an inert dielectric layer (13) and a metal film (14). A pulsed laser beam (15) directed at the surface of the metal film layer (14). When the laser is pulsed on, a small amount of metal is ablated directly under the beam and surface tension in the surface of molten metal surrounding the ablated region pulls the metal back from the hole causing a slight thickening of the metal (17) around the hole, and creates a hole (16) which is significantly larger in diameter than the ablated region.

28 Claims, 4 Drawing Sheets

METAL FILM INTERRUPTING PROCESS

INTRODUCTION

The present invention relates generally to the field of semiconductor device fabrication and in particular the invention provides an improved method for electrically isolating regions of metal contact film in a semiconductor device.

BACKGROUND OF THE INVENTION

A major advantage of thin-film photovoltaic (PV) modules over conventional wafer-based modules is that series interconnection of the individual cells can be accomplished using a deposited metal film. But this same film that provides electrical continuity from one cell to the next will also short out each cell unless the metal film is interrupted between each cell's n- and p-type contacts.

Three techniques are commonly used to interrupt a thin metal film. One method is to mechanically scribe through the metal. In a second method, a strip of metal is removed with a laser. A third method is to place a mask over the silicon during metal deposition,

Mechanical Scribing

A pointed tool can be dragged across the surface of the metal, peeling away a narrow strip of metal. This technique works well when the underlying material is harder than the tool tip. But the method only works on planar surfaces. In a thin-film module based on polycrystalline silicon (pc-Si), surface texture is essential for light trapping, and any significant texture makes it impossible to scribe cleanly through the metal without leaving bridges across the gap or damaging the silicon.

Laser Ablation

One way of dealing with textured surfaces is to use a laser to scribe the metal by ablation. Normally, the underlying silicon is damaged in the process. This technique works in PV modules based on amorphous silicon (a-Si) because a-Si has a very high lateral resistance so that only a relatively small area of the module is impacted by the damage. But in pc-Si the lateral resistance is orders of magnitude lower, so that a single shunt ruins the entire cell.

It is also known in amorphous silicon solar cell technology to locate a light reflecting or light absorbing layer under the region of metal to be ablated to protect the underlying a-Si from damage during the ablating process.

Laser ablation is also used routinely in trimming resistor values during fabrication of analog integrated circuits. The trimming is done in inactive regions where damage to the underlying silicon does not affect the circuit's operation. But in pc-Si solar cells, an inactive region would need to be electrically isolated from both cell polarities. This inactive region would isolate the cell on one side from the contact on the other side and vice-versa so that no current could be collected from the cell.

Masking

The other method used to interrupt a metal film is to place a mask in front of the silicon during metal deposition. The mask may be composed of taut parallel wires. The wires 'shade' small strips of the module from deposition, providing the needed interruption in the metal film. This approach works in a-Si modules because the n- and p-type contacts can be widely separated (typically 10 mm), leaving adequate room to align the wire mask. The wide contact separation is a direct result of using a transparent conductive oxide (TCO) in combination with the metal film to provide excellent lateral conductance for both contact polarities.

There are three problems with using TCO in a pc-Si module. First, there is a risk that the TCO will contaminate the silicon during high-temperature steps used to crystallise and anneal the pc-Si film. Second, it is anticipated that TCO may introduce excessive shunting where laser grooves are used to define the boundaries between cells. Third, TCO would be an expensive addition to the pc-Si fabrication sequence. Until these three issues are dealt with successfully, TCO cannot be used to increase the lateral conductance in a pc-Si module. Because the conductance of pc-Si layers are an order of magnitude smaller than TCO, the contacts in a pc-Si module must be more closely spaced (typically 1 mm), making the alignment requirements for masked deposition problematic.

U.S. Pat. Nos. 5,208,437 and 4,081,653 both disclose methods of using a laser to remove metal from a surface. U.S. Pat. No. 5,208,437 uses laser pulses of very short duration to remove the metal in small increments to avoid damaging the underlying substrate. However, this process is slow and expensive. On the other hand. U.S. Pat. No. 4,081,653 discloses a method which uses a laser to heat a region of a substrate through an overlying layer, to vaporise the substrate without melting the overlying layer to thereby cause an explosive expansion of the vaporised substrate material to remove the overlying coatings This destructive approach is not applicable to photovoltaic modules.

U.S. Pat. Nos. 4,783,421 and 4,854,974 disclose methods of forming grooves in a metal contact layer, formed over the back of an amorphous silicon solar cell array, to separate contact areas of adjacent cells. This method relies on formation of a light absorbing or light reflecting barrier laid over the amorphous silicon semi-conductor material before the metal is layered down to protect the underlying silicon while the groove is ablated in the metal.

SUMMARY OF THE INVENTION

According to a first aspect, the present invention provides a method of electrically isolating regions of a metal film located over a delicate underlying structure by parting the film along a predetermined path, the method including the steps of:

a) prior to forming the metal film, forming an inert or substantially inert layer over the underlying structure, at least in the region of a required isolation gap;

b) forming the metal film over the underlying structure and the inert layer, c) forming a series of holes through the metal film by ablating material from the metal film along the isolation path, to separate adjacent contacts, using a pulsed long wavelength laser, the laser pulse repetition rate, scan speed and power being selected to cause incomplete ablation of the material along the isolation path, while forming overlapping adjacent melt zones, the ablated material being sufficient to enable adjacent holes to join due to surface tension while the metal in the region of the holes is molten, while leaving the inert layer unbroken in the region of the isolation path.

According to a second aspect, the present invention provides a method of applying a plurality of metal film contacts to a crystalline thin film semiconductor device, including the steps of:

a) prior to forming the metal film, forming an inert or substantially inert layer over an underlying structure, of the semiconductor device at least in the region of a required isolation gap, b) forming the metal film over the underlying structure and the inert layer, c) forming a series of holes through the metal film by ablating material from the metal film along the isolation path, to separate adjacent contacts, using a pulsed long wavelength laser, the laser pulse repetition rate, scan speed and power being selected to cause incomplete ablation of the material along the isolation path, while forming overlapping adjacent melt zones, the ablated material being sufficient to enable adjacent holes to join due to surface tension while the metal in the region of the holes is molten, while leaving the inert layer unbroken in the region of the isolation path.

Various embodiments of the invention provide a method in which a small amount of material is ablated from the metal film sufficient to disrupt the surface tension in the metal, without cutting through the underlying inert layer. This allows the molten metal surrounding the ablated region to draw back forming a hole, and provided that the holes are sufficiently closely spaced, the drawing back will result in the holes joining to form a continuous gap in the film. The important parameters in this process are selected according to the requirements of the particular application as follows:

1. Pulsed Long-wavelength Laser.

The power and duration of each laser pulse is preferably chosen to ablate material from the metal without cutting through the underlying inert layer. Preferably also, a wavelength is chosen which is weakly absorbed in the material under the inert layer. If possible a wavelength which is also weakly absorbed in the inert layer is preferable. Preferably also the laser is focussed to allow for variations in the height of the surface due to surface features such as texturing and lack of flatness of the underlying structure over the area of the device. For the metal/dielectric combinations tested a laser typically operated at 1064 nm and 2 kHz has been found effective. By using a high laser power with a highly defocussed beam it has been demonstrated that up to 3 mm of vertical deformation can be tolerated.

2. Thick Inert Layer.

The inert layer must be selected to withstand the heat of the laser ablating the overlying metal. The thickness will depend on the characteristics of the dielectric and the overlying metal but for Aluminium over Phosphosilicate Glass (PSG) it has been found that the PSG layer should be at least in the same order of thickness as the metal and preferably at least two times the metal thickness while thicknesses of five or ten times the metal thickness are highly preferred (typically 500–1000 nm for 100–200 nm Aluminium). In solar cell applications, the upper limit of inert layer thickness is determined by formation cost, as there are no detrimental performance effects caused by greater thickness in this application.

It has also been found effective to use organic resins such as Novolac™ as the inert material in which case, the thickness of the resin would preferably be in the range of ten to twenty times the metal thickness and typical devices would have resin layers in the range of 2–4 $\mu$m for aluminium layers in the range of 100–200 nm. Other dielectrics such as Silicon Dioxide or, Silicon Nitride are also effective.

3. Low Melting-point Metal.

By using a low melting point metal less laser energy is required to interrupt the metal and therefore the inert layer can be thinner. Aluminium with a melting point of 660° C. has proven to be a suitable metal for the purpose, however in other applications metals such as Tin (232° C.). Silver (960° C.), Gold(1062° C.), or Copper 1083° C. may be used.

4. Thin Metal Layer.

The metal layer should be kept as thin as possible to achieve its purpose. Excess metal thickness requires additional energy to create a hole and accordingly requires additional inert layer thickness. For thin film solar cells metal contact films of typically 100–200 nm can be accommodated but in other applications metal layers of micron order or even of hundreds of microns may be scribed using this process.

5. Very Thin Metal Interlayer.

Tile provision of a very thin metal interlayer between the primary metal layer and the inert material can enhance the parting action of the metal by selecting an interlayer which does not adhere well to the inert layer. In the case of Novolac™ resin, it has been found advantageous to interpose a layer of nickel between the resin and the primary layer which is typically aluminium. In the case of Novolac™, nickel and aluminium, the aluminium layer would preferably be in the range of 5 to 20 times the nickel layer thickness and typically, a nickel layer of 10 nm would be employed with a 100 nm aluminium layer.

BRIEF DESCRIPTION OF THE DRAWINGS

Embodiments of the invention will now be described by way of example with reference to the accompanying drawings in which.

DETAILED DESCRIPTION OF EMBODIMENTS OF THE INVENTION

Embodiments of the invention provide a method of interrupting a metal film without damaging the underlying silicon or causing the metal to contact the silicon along the edges of the interruption path. This is accomplished using a laser in a manner similar to conventional laser ablation but with the metal film separated from the silicon by an inert layer. The high lateral conductance of pc-Si films makes it possible to insert an insulating dielectric layer between the silicon and the overlying metal. Contact between the metal and silicon can be implemented at selected locations by creating small openings through the dielectric layer.

For thin film silicon solar cell applications, the process has been found to work reliably when the following four attributes are combined:

1. Pulsed long-wavelength laser (typically 1064 nm at 2 kHz)
2. Thick dielectric layer (typically 500–3000 nm)
3. Low melting-point metal (typically Al, 660° C.)
4. Thin metal layer (typically 100–2001 nm)

A portion of the energy in each focussed pulse of the laser is absorbed by the metal. A small hole is ablated and the region around it is melted. The small hole in the molten metal introduces a free surface which allows surface tension to pull the molten metal back away from the hole. A series of closely spaced pulses forms a continuous interruption that separates the metal layer.

When the metal pulls back along the edges of the scribe, it exposes the underlying silicon to subsequent pulses of the laser beam. If the laser beam has a long wavelength that is poorly absorbed in silicon, the heating of the silicon is minimised. Operating the laser in pulsed mode gives the heat less time to conduct to the underlying layers before the metal at the centre of the beam reaches ablation temperature.

Some heat is transferred from the molten metal to the inert layer, but a sufficiently thick inert layer prevents the temperature of the underlying silicon from rising significantly. Use of a thin, low melting-point metal also helps. Less heat is transferred from the molten material to the underlying layers, and only a small amount of metal needs to be ablated to achieve a given hole diameter.

When the four favourable attributes are combined, the process is reliable and tolerates significant variability in process parameters, including laser focus, laser power, thickness of the metal and dielectric layers, and surface roughness.

Figure 1:
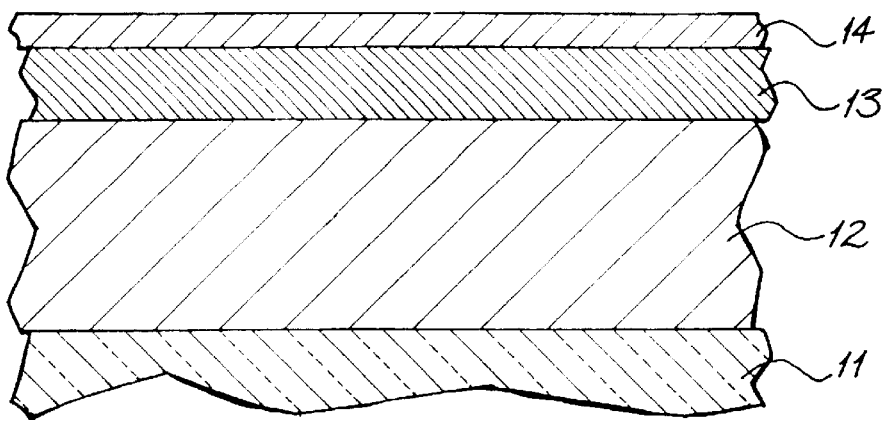
FIG. 1 shows a cross-sectional view through a simple device structure to which the interrupting process of the present invention may be applied.

Referring to FIG. 1 a simple thin film structure is illustrated in which a substrate 11, which may be glass or any other suitable substrate material, supports a device structure 12, over which is formed an inert dielectric layer 13 and a metal film 14. The device structure is not shown in detail, but may be any appropriate structure that requires contacting to via a metal contact.

Figure 2:
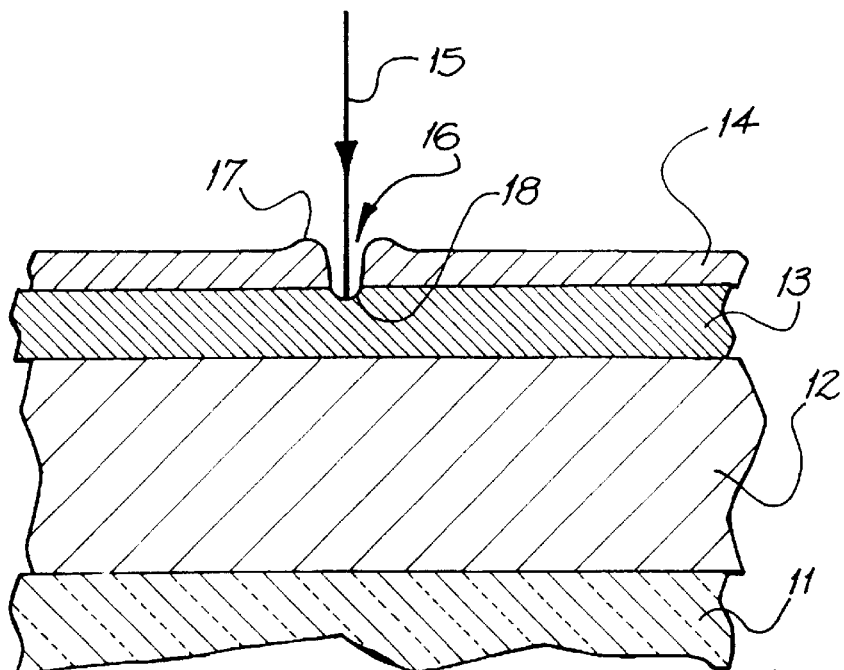
FIG. 2 shows the method according to an embodiment of the present invention when applied to the structure of FIG. 1.

In FIG. 2, the structure of FIG. 1 is shown with a pulsed laser beam 15 directed at the surface of the metal film layer 14. When the laser is pulsed on, a small amount of metal is ablated directly under the beam and surface tension in the surface of molten metal surrounding the ablated region pulls the metal back from the hole causing a slight thickening of the metal 17 around the hole, and creates a hole 16 which is significantly larger in diameter than the ablated region. In the process of ablating the metal, a small amount of inert dielectric material will also be lost creating a small hollowing 18 of the dielectric under the hole 16 in the metal film.

Figure 3:
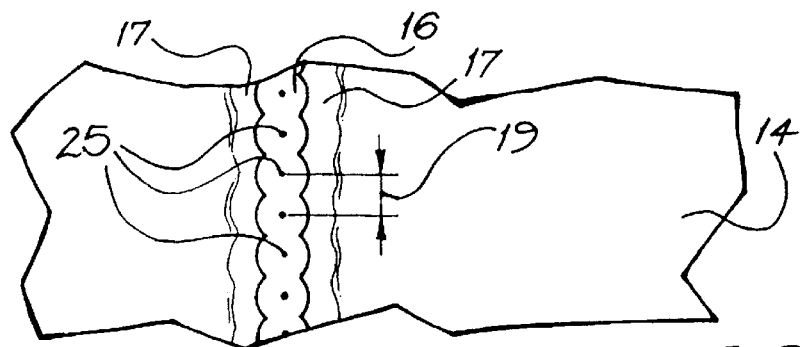
FIG. 3 shows a top view of the structure of FIG. 2 after the metal film has been interrupted.

A top view of the device of FIG. 2 is shown in FIG. 3, in which it can be seen that by pulsing the laser on centres 25 spaced at a regular pitch 19, a series of joined holes 16, surrounded by a pair of metal mounds 17, are formed to provide a continuous gap separating two regions of the metal film that are to be electrically isolated from one another.

Figure 4:
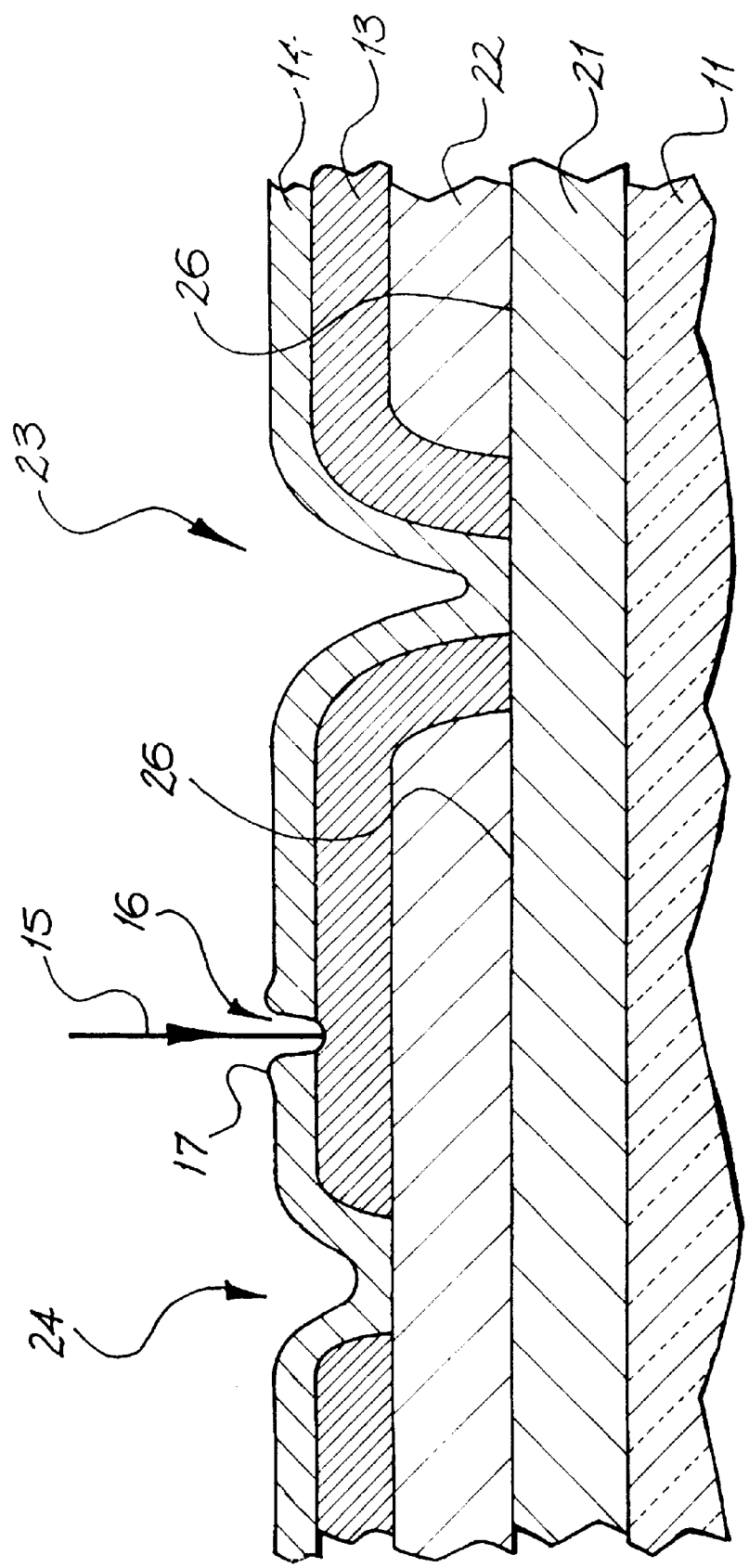
FIG. 4 shows a cross-sectional view through a single junction thin film photovoltaic device while the method according to an embodiment of the invention is being applied.

Turning now to FIG. 4, a cross sectional side view is shown of a single junction photovoltaic device including a first doped semiconductor film 21 and a second doped semiconductor film 22 which form a rectifying junction 26. The second doped film 22 has periodic openings in regions 23 to enable connection through to the underlying doped film 21. An inert dielectric film 13 is then deposited over the doped film 22 but is opened in the bottom of the openings in the doped layer 22 and is also provided with additional periodic openings in regions 24 to allow contact to the doped film 22. A metal film 14 is then formed over the dielectric film and extending into the openings in regions 23 and 24 to thereby contact with the doped films 21 and 22 respectively. A gap formed as a series of holes 16 is then provided by the method as described, with reference to FIGS. 2 and 3, to separate the metal contacting the first doped semiconductor film 21 from the metal contacting the second doped semiconductor film 22.

Figure 5:
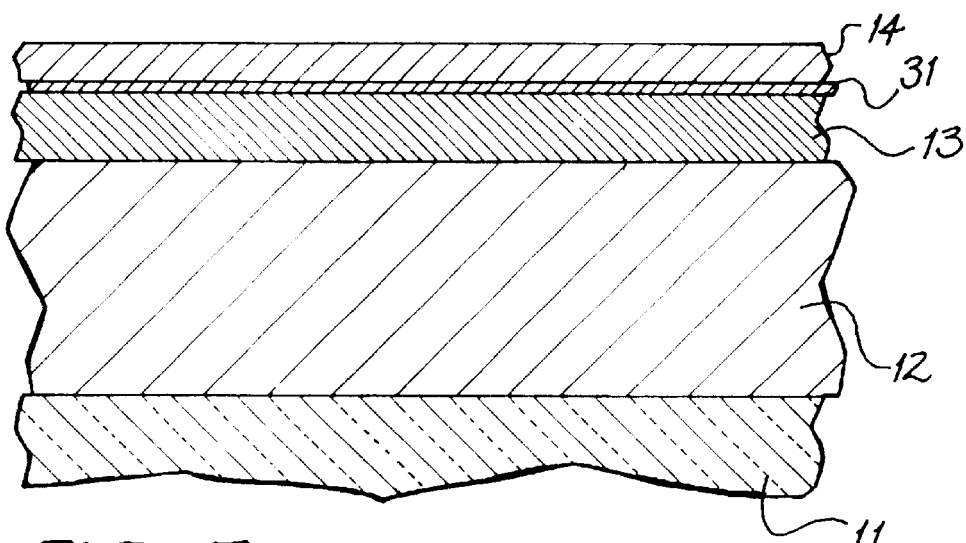
FIG. 5 is a cross section, a similar to that of FIG. 1, but with a thin metal interlayer between the metal layer and the dielectric layer of the FIG. 1 device.

Referring to FIG. 5, a simple thin film structure is illustrated in which a substrate 11, which may be glass or any other suitable substrate material, supports a device structure 12, over which is formed an inert dielectric layer 13 a metal interlayer 31 and a metal film 14. The device structure is not shown in detail, but, as with FIG. 1 may be any appropriate structure that requires contacting to via a metal contact. The provision of a metal interlayer 31, has been found to enhance the behaviour of the combined metal film 31, 14, when performing the interruption method according to the present invention.

Figure 6:
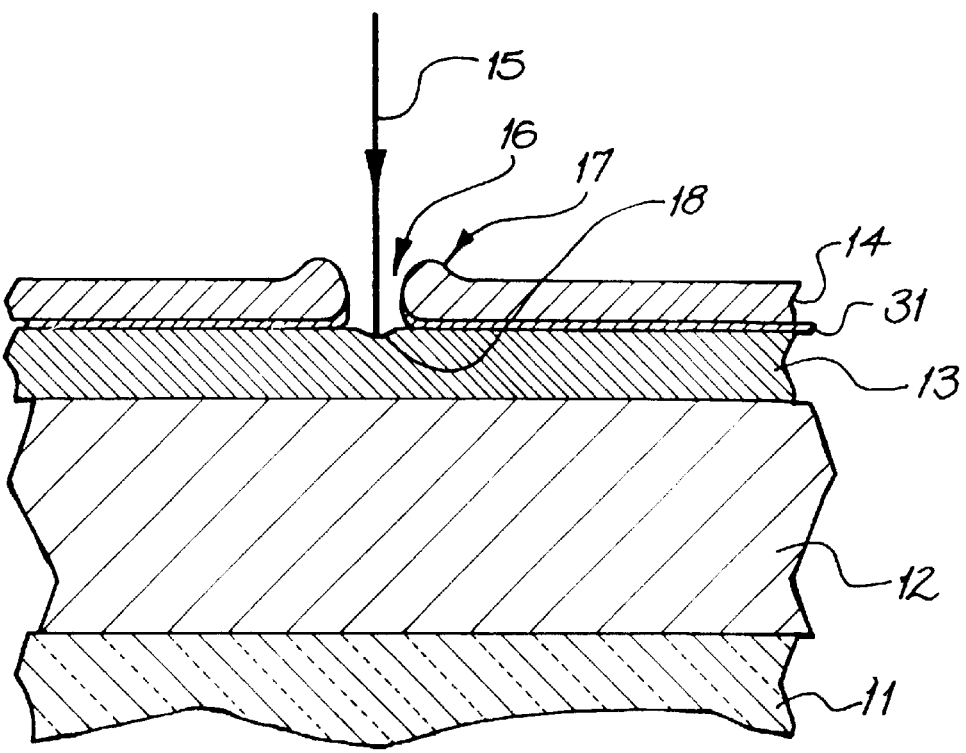
FIG. 6 shows the method according to an embodiment of the present invention when applied to the structure of FIG. 5.

In FIG. 6, the structure of FIG. 5 is shown with a pulsed laser beam 15 directed at the surface of the metal film layer 14. When the laser is pulsed on, a small amount of metal is ablated directly under the beam and surface tension in the surface of molten metal surrounding the ablated region pulls the metal back from the hole causing a slight thickening of the metal 17 around the hole, and creates a hole 16 which is significantly larger in diameter than tie ablated region. Because the adhesion of the nickel layer 31 to the underlying dielectric which is in this case, an organic resin known as Novolac™, is not as great as is the case for aluminium, the combined aluminium and nickel layer 14, 31 peels back more readily than in the case of aluminium alone as described with respect to FIGS. 1 and 2. In the process of ablating the metal, a small amount of inert dielectric material will also be lost creating a small hollowing 18 of the dielectric under the hole 16 in the metal film.

The top view of the device of FIG. 5 will be essentially identical to that of FIG. 2, as shown in FIG. 3, in which it can be seen that by pulsing the laser on centres 25 spaced at a regular pitch 19, a series of joined holes 16, surrounded by a pair of metal mounds 17, are formed to provide a continuous gap separating two regions of the metal film that are to be electrically isolated from one another.

Figure 7:
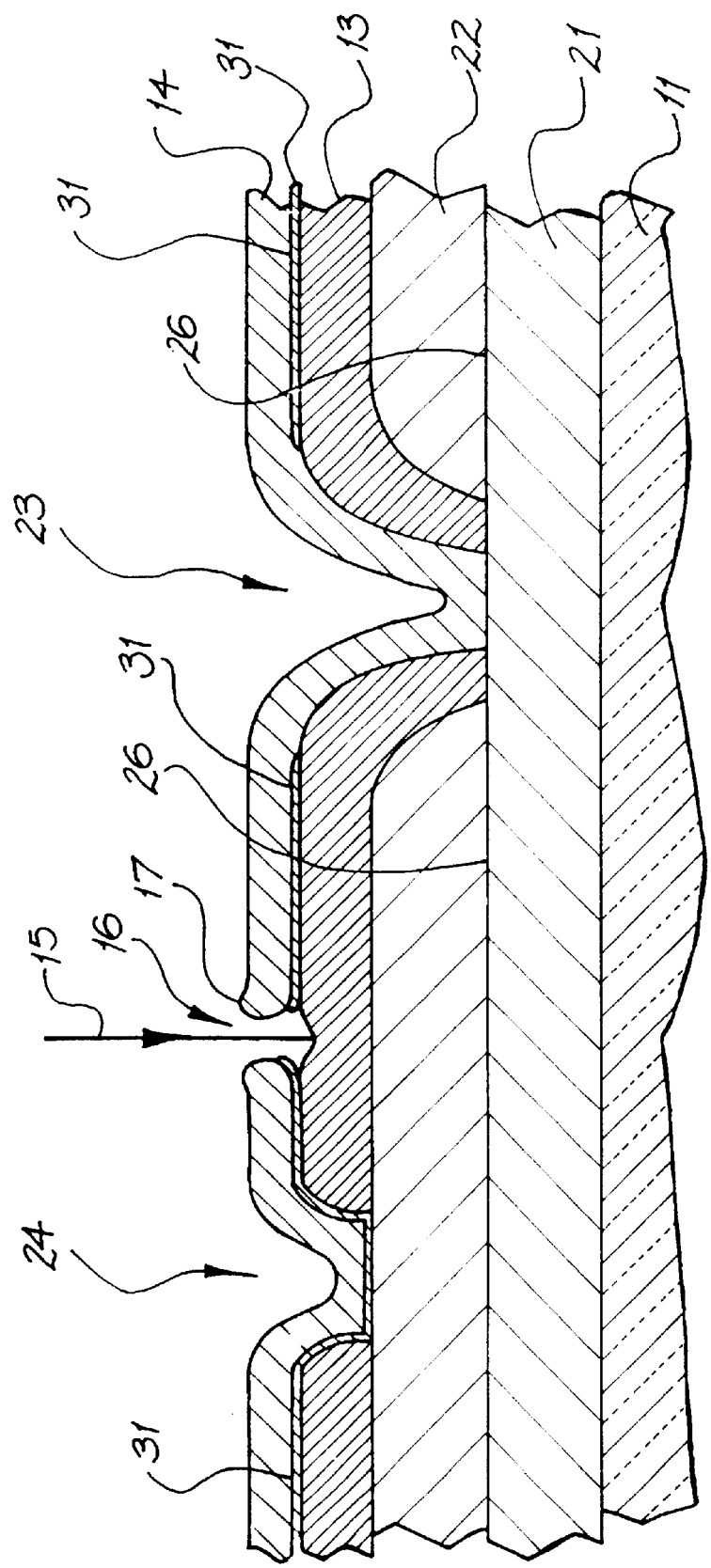
FIG. 7 shows a cross-sectional view through a single junction thin film photovoltaic device similar to that of FIG. 4, but with the interlayer of FIG. 5, while the method according to an embodiment of the invention is being applied

Turning now to FIG. 7, a cross sectional side view is shown of a single junction photovoltaic device including a first doped semiconductor film 21 and a second doped semiconductor film 22 which form a rectifying junction 26. The second doped film 22 has periodic openings in regions 23 to enable connection through to the underlying doped film 21. An inert dielectric film 13 is then deposited over the doped film 22 but is opened in the bottom of the openings in the doped layer 22 and is also provided with additional periodic openings in regions 24 to allow contact to the doped film 22. A nickel interlayer 31, is laid down over the dielectric layer 13 as in the FIGS. 5 and 6 embodiment and a metal film 14 is then formed over the nickel inter layer 31 and extending into the openings in regions 23 and 24 such that the nickel/aluminium layers 31, 14 contact with the doped films 21 and 22 respectively. A gap formed as a series of holes 16 is then provided by the method as described, with reference to FIGS. 5 and 6, to separate the metal contacting the first doped semiconductor film 21 from the metal contacting the second doped semiconductor film 22.

In an experiment to define a process according to a first embodiment of the present invention, a 400 nm thick aluminium layer separated from underlying silicon by a 300- nm-thick layer of deposited silicon nitride was scribed through using the laser at a wavelength of 1064 nm. Successful interruption of the metal layer was achieved both on a planar silicon wafer and on a film of polycrystalline silicon (pc-Si) deposited on textured glass. Although the nitride was thinned in the process, there was no visible impact on the underlying silicon. However, the process window was narrow, and could only tolerate sample deformation (which affects laser focus) of ±0.5 mm.

In a second experiment, the 400 nm layer of aluminium was separated from the silicon by a 300 nm layer of silicon nitride. The best results using a 1064 nm laser were obtained using high laser power (significantly defocussed) at a low pulse repetition rate. The process window was again only ±0.5 mm. A series of scribes on a planar pc-Si film using the optimised settings showed good metal isolation both across the gap and from the underlying silicon.

A further experiment was performed to examine the effect of the following factors on scribe effectiveness:

1. Metal thickness
2. Dielectric thickness
3. Surface texture
4. Laser wavelength
5. Laser power
6. Scan speed
7. Pitch between pulses
8. Purge gas flow The experiment determined that the most beneficial factors were, in decreasing order of significance, Long laser wavelength, No surface texture, Thin metal, High laser power (requiring a highly defocussed beam), and Thick dielectric. The remaining factors were not statistically significant within the range studied.

Yet another experiment was conducted to examine textured samples. The laser wavelength and the aluminium film thickness were fixed at their favourable extremes of 1000 nm for the dielectric and 100 nm for the metal. The scan speed was kept constant at the economically attractive speed of 200 mm/s. The experiment demonstrated that the lowest pulse repetition rate that gives a continuous scribe is strongly preferred. The pulse repetition rate and the pitch between pulses are related to each other by the scan rate. Under the optimised conditions, scribes were demonstrated which tolerate tip to 3 mm of vertical deformation on textured samples Both of these experiment relied solely on visual inspection to determine that the laser did not damage the underlying silicon.

A further experiment in this series tested the process according to the second embodiment on active solar cells formed using a polycrystalline silicon film deposited on both planar and textured glass substrates. Two strings of twelve small-area cells were formed on each substrate. The inert layer consisted of a stack of 70 nm of silicon nitride and 1000 nm of densified Phosphosilicate glass. The metal was 100 nm of aluminium. The metal for one of the strings of twelve cells was interrupted according to the second embodiment using a pulsed 1064 nm laser at 5 kHz with a scan speed of 200 mm/s. The metal for the other string of twelve cells was interrupted in a conventional manner by inserting a mask during the metal deposition process. The performance of the laser-defined cells was essentially identical to that of the mask-defined cells. Specifically, the laser process produced slightly better results on the planar substrate and slightly worse results on the textured substrate, but in neither case was the difference statistically significant.

A quantity of cells have also been manufactured, in which the dielectric material is Novolac™ resin and a nickel interlayer is located between the Novolac™ layer and the aluminium layer. The dielectric and aluminium film thicknesses were fixed at their favourable extremes of 2000 nm for the dielectric and 100 nm for the metal and in addition, a 10 nm nickel film was located between the dielectric and aluminium layers. The scan speed was kept constant at the economically attractive speed of 200 mm/s. The experiment demonstrated that the lowest pulse repetition rate that gives a continuous scribe is strongly preferred. The pulse repetition rate and the pitch between pulses are related to each other by the scan rate. Under the optimised conditions with a pulse rate of 2 kHz, scribes were demonstrated which again tolerate up to 3 mm of vertical deformation on textured samples.

This set of conditions results in excellent separation of the metal with a single pass of the laser and again provided good tolerance to surface texture and deformation.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

What is claimed is:

1. A method of electrically isolating regions of a metal film located over a delicate underlying structure by parting the metal film along a predetermined path, the method including the steps of:

a) prior to forming the metal film, forming an inert or substantially inert layer over the underlying structure, at least in the region of a required isolation gap in the metal film;

b) forming the metal film over the underlying structure and the inert layer;

c) forming a series of holes through the metal film by ablating material from the metal film along the isolation path, to separate adjacent contacts, using a pulsed long wavelength laser having a wavelength which is only weakly absorbed by the underlying structure to minimize heating thereof, the laser pulse repetition rate, scan speed and power being selected to cause incomplete ablation of the material along the isolation path, while forming overlapping adjacent melt zones, the ablated material being sufficient to enable adjacent holes to join due to surface tension while the metal in the region of the holes is molten, while leaving the inert layer unbroken in the region of the isolation path.

2. A method of applying a plurality of metal film contacts to a crystalline thin film semiconductor device, including the steps of:

a) prior to forming the metal film, forming an inert or substantially inert layer over an underlying structure of the semiconductor device at least in region of a required isolation gap in the metal film;

b) forming the metal film over the underlying structure and the inert layer;

c) forming a series of holes through the metal film by ablating material from the metal film along the isolation path, to separate adjacent contacts, using a pulsed long wavelength laser having a wavelength which is only weakly absorbed by the underlying structure to minimize heating thereof, the laser pulse repetition rate, scan speed and power being selected to cause incomplete ablation of the material along the isolation path, while forming overlapping adjacent melt zones, the ablated material being sufficient to enable adjacent holes to join due to surface tension while the metal in the region of the holes is molten, while leaving the inert layer unbroken in the region of the isolation path.

3. The method of claim 1 or 2, wherein the power and duration of each laser pulse is chosen to ablate material from the metal layer without cutting through the underlying inert layer.

4. The method of claim 1 or 2, wherein the power and duration of each laser pulse is chosen to ablate material from the metal layer without cutting into the underlying inert layer.

5. The method of claim 1, wherein the laser is chosen to have a wavelength which is weakly absorbed in the inert layer.

6. The method as claimed in claim 1, wherein the laser is operated notionally at 1064 nm and 2 kHz.

7. The method as claimed in any one of claims 1 or 2, wherein the laser is focussed to allow for variations in the height of the surface due to surface texturing and lack of flatness of the underlying structure over the area of the device.

8. The method of claim 7, wherein a high laser power is used with a highly defocussed beam.

9. The method as claimed in any one of claims 1 or 2, wherein the metal layer is formed of a metal with a melting point below 1200° C.

10. The method as claimed in claim 9, wherein the metal layer is a 100 nm thick layer of aluminium and the inert layer is a dielectric which is a 2000 nm layer of an organic resin.

11. The method as claimed in any one of claims 1 or 2, wherein the metal layer is formed of aluminium.

12. The method as claimed in any one of claims 1 or 2, wherein the metal layer is formed of tin.

13. The method as claimed in any one of claims 1 or 2, wherein the metal layer is formed of copper.

14. The method as claimed in any one of claims 1 or 2, wherein the metal layer is formed of gold.

15. The method as claimed in any one of claims 1 or 2, wherein the metal layer is formed of silver.

16. The method as claimed in any one of claims 1 or 2, wherein the inert material is silicon dioxide.

17. The method as claimed in any one of claims 1 or 2, wherein the inert material is phosphosilicate glass.

18. The method as claimed in any one of claims 1 or 2, wherein the inert material is an nitride.

19. The method as claimed in any one of claims 1 or 2, wherein the inert material is an organic resin.

20. The method as claimed in any one of claims 1 or 2, wherein the thickness of the inert layer is at least in the same order of thickness as the metal layer.

21. The method as claimed in claim 20, wherein the inert layer is at least two times the metal layer thickness.

22. The method as claimed in any claim 21, wherein, the inert layer thickness is five to ten times the metal layer thickness.

23. The method as claimed in any one of claims 1 or 2, wherein a metal interlayer is located between the metal layer and the inert layer, metal in the metal interlayer being different than metal of the metal layer and being selected to bond less well with the inert layer than the metal of the metal layer.

24. The method of claim 23, wherein the metal of the metal interlayer is nickel.

25. The method of claim 23, wherein the metal of the metal interlayer is copper.

26. The method of claim 23, wherein the metal of the metal interlayer is tin.

27. The method of claim 23, wherein the thickness of the metal interlayer is an order of magnitude thinner than the metal layer.

28. The method of claim 23, wherein the metal layer is 100–200 nm thick and the metal interlayer is 10–20 nm thick.

* * * * *